United States Patent [19]

Hogan

[11] 3,878,179

[45] Apr. 15, 1975

[54] POLYMERIZATION OF OLEFINS

[75] Inventor: John P. Hogan, Bartlesville, Okla.

[73] Assignee: Phillips Petroleum Company, Bartlesville, Okla.

[22] Filed: Jan. 17, 1973

[21] Appl. No.: 324,437

Related U.S. Application Data

[63] Continuation-in-part of Ser. No. 812,850, April 2, 1969, abandoned.

[52] U.S. Cl.... 260/88.2 R; 260/94.9 D; 260/94.9 E
[51] Int. Cl. ....... C08f 15/04; C08f 1/42; C08f 1/66
[58] Field of Search .. 260/94.9 D, 94.9 DA, 94.9 E; 260/88.2 R

[56] References Cited

OTHER PUBLICATIONS

Ham, G. E. (Ed.), "Copolymerization," pp. 101–103, J. Wiley & Sons, Inc., New York (1964).

*Primary Examiner*—Joseph L. Schofer
*Assistant Examiner*—A. Holler

[57] ABSTRACT

High melt index polymers are produced in an olefin polymerization process employing as a catalyst the hydrocarbon insoluble interreaction product resulting from contacting a supported chromium oxide catalyst with an aluminum hydrocarbyl oxide of the general formula $R_xAl(OR)_y$, which formula is defined.

9 Claims, No Drawings

POLYMERIZATION OF OLEFINS

This is a continuation-in-part of my application Ser. No. 812,850 filed Apr. 2, 1969, now abandoned.

This invention relates to polymerization of alpha olefins.

In one of its more specific aspects, this invention relates to the melt index properties or products produced by olefin polymerization.

Polymerization of olefins in the presence of chromium oxide catalyst system, such as the so-called "particle-form" or slurry process, is well known. Generally, such systems produce polymers of comparatively low melt index. Many attempts have been made to increase the melt index of the polymer produced in such polymerization reactions.

Frequently, an adjuvant is introduced in the catalyst system for this purpose. Many such materials can be employed, one of which is dialkylaluminum alkoxide. When a dialkylaluminum alkoxide is reacted with the $CrO_3$-silica catalyst system and the resulting system employed for olefin polymerization, polymers of high index are obtained. In a slurry process, however, the maximum melt index which can be obtained with such a catalyst system is lower than would be preferred.

A slurry process has now been discovered which employs a catalyst system which produces a more desirable, higher melt index produce. According to the method of this invention, there is provided a process which comprises contacting an aluminum hydrocarbyl oxide of the general formula $R_xAl(OR)_y$, as hereinafter defined, with a supported chromium oxide catalyst in the presence of a hydrocarbon diluent to form a reaction mixture, separating hydrocarbon-insoluble material from the reaction mixture to leave a hydrocarbon insoluble residue and employing the hydrocarbon-insoluble residue as a catalyst in olefin polymerization to produce a high melt index polymer.

In one embodiment of this invention, an aluminum hydrocarbyl oxide is contacted with the supported chromium oxide catalyst.

In another embodiment of this invention, an aluminum hydrocarbyl oxide in combination with a hydrocarbylmetal is contacted with the supported chromium oxide catalyst.

Accordingly, it is an object of this invention to provide a process for producing a polymer having melt index.

It is another object of this invention to provide a novel polymerization catalyst.

Other objects of this invention will become evident from the following disclosure.

The chromium catalyst systems to which this invention is particularly applicable is one in which the chromium is in the form of the oxide and is supported by at least one support component selected from the group consisting of silica, alumina, zirconia, and thoria. Generally, the support component will have been impregnated with an aqueous solution of chromium compound, calcinable to chromium oxide, the chromium consisting of at least about 0.1 weight percent of the total chromium-support or catalyst system. The resulting catalyst is particularly suitable for polymerization of monoolefins at temperatures up to about 500°F., at least a portion of the chromium being in a hexavalent state upon initial contact with aluminum hydrocarbyl oxide or hydrocarbon feed.

The chromium oxide catalyst system is contacted, in one embodiment of this invention, with an alkoxide, preferably an aluminum hydrocarbyl oxide of the general formula $R_xAl(RO)_y$ in which x and y are integers from 1 to 2 inclusive and $x + y = 3$, and R is a hydrocarbyl group contatining from 1 to about 14 carbon atoms. The R hydrocarbyl group can be selected from such hydrocarbon groups as the alkyl, aryl, alkaryl, alicyclic, and the bicyclic. Illustrative of such hydrocarbon groups are methyl, ethyl, cyclohexyl, tetradecyl, phenyl, phenethyl, norbornyl methyl. The R groups can be identical or different. Preferred aluminum hydrocarbyl oxides are those containing the lower alkyl groups, such as diethylaluminum ethoxide, methylaluminum diethoxide, diisbutylaluminum isobutoxide, and the like.

In another embodiment of this invention a hydrocarbylmetal is employed in combination with alkoxide as the activating component. These hydrocarbylmetals include compounds of the formula $R_xM$ where R is a hydrocarbyl radical having from 1 to 14 carbon atoms as hereinbefore defined, M is an amphoteric metal such as aluminum or zinc and x is equal to the valence of the metal M. Typical compounds are triethylaluminum, triisobutylaluminum, and diisopropylzinc.

The chromium oxide catalyst system is contacted with the alkoxide over the wide range of about 0.2 mol of the alkoxide to one mol of the chromium oxide, to about 20 mols of the alkoxide to one mol of the chromium oxide. If a hydrocarbylmetal is also employed it is used in an amount of about 0.1 to about 1 mole per mol of the alkoxide.

In the formation of the reaction mixture, the various materials are brought together in a paraffinic hydrocarbon diluent such as isobutane or n-hexane. Thereafter, the larger part of the hydrocarbon diluent, and those materials soluble in it, is separated from that portion of the reaction mixture substantially insolbule in the hydrocarbon diluent, after which additional hydrocarbon-soluble residuals are removed from the insolubles by washing the solubles with quantities of a hydrocarbon diluent. In other words, that diluent employed for removing solubles from the insoluble catalyst system can be the same or different from that material in which the formation of the reaction mixture took place. Either or both materials may be paraffins, such as butane, isobutane, pentane, or octane, cycloparaffins, such as cyclopentane, methylcyclopentane, or cyclohexane, or aromatics, such as benzene, toluene, or xylene, and the like, and mixtures thereof.

The polymerization conditions under which the process of this invention is conducted are conventional within the art, including a temperature from about 100 F. to about 450 F., and a pressure high enough to maintain the hydrocarbon medium in the liquid phase. Generally, the polymer will be formed within the hydrocarbon medium in the form of a separable slurry. Prior to forming the insoluble reaction product or modified chromium oxide catalyst system, the supported chromium oxide is activated at a temperature from about 350°F. to about 1,500°F. by procedures known in the art.

U.S. Pat. No. 2,825,721 to Hogan et al, and British Pat. No. 853,414 set forth the details of the prior art process.

The following examples will serve to illustrate the invention but are not intended to limit the invention.

A catalyst, prepared by impregnating a microspheroidal silica with sufficient aqueous chromium trioxide solution to give a chromium content of one weight percent, was activated in air for 5 hours at 800°F. This catalyst served as the basic catalyst in the following preparations and runs.

Run 1 0.1135 part by weight of this basic catalyst was admixed with 500 parts by weight of isobutane. To this admixture was added a mixture of 8 parts by weight of diisobutylaluminum isobutoxide and one part by weight of triisobutylaluminum in n-hexane, the ratio of the total weight of the alkoxide and alkylaluminum to the weight of the catalyst being about 8 to 100.

The temperature of the mixture was raised to about 220°F. over a 30 minute period. Without further treatment of this unwashed reaction mixture, polymerization of ethylene, to which had been added 6 percent 1-butene was conducted, at 220°F. and 550 psig for 2 hours. Results were as shown as Run 1 in Table I below.

In Run 2 a dry nitrogen atmosphere, 5.5 parts by weight of the basic catalyst were admixed with n-hexane and a mixture of diisobutylaluminum isobutoxide and triisobutylaluminum in n-hexane, in the same proportions to each other and to the catalyst as in Run 1, was added to the catalyst. After mixing, the n-hexane (about 75 ml) was drained off and an additional 75 ml of n-hexane was added to the insolubles remaining, the mixture shaken and the n-hexane drained off. The insoluble catalyst was dried of n-hexane to produce a twice-washed catalyst system of this invention. 0.1112 part by weight of this catalyst was employed in polymerization under conditions indentical to those of Run 1. Results were as shown in Table I, below.

The Run 3 catalyst was prepared as in Run 2 except that the insoluble catalyst, after draining of the original n-hexane diluent, was not washed thereafter. This produced a once-washed catalyst system which was employed in polymerization under conditions identical to those of Run 1. Results were as shown in table I, below, all runs having been made in the presence of isobutane as the only effective solvent, as was Run 1, any solvent employed for the purpose of washing the catalyst having been, in effect, eliminated thereafter to the extent that the solvent employed to wash the catalyst was not effectively present during the polymerization to the extent of affecting the physical properties of the polymer product produced.

The run 4 catalyst was prepared as in Run 2, except that it was prepared in the presence of n-pentane rather than in the presence of n-hexane, a single contact with the n-pentane being made. This produced a onece-washed catalyst of this invention which was employed in the polymerization under conditions identical to those of Run 1. Results were as shown in Table I, below.

the hydrocarbon-soluble reaction products from the reaction mixtute improved the melt index of the subsequently produced polymer. These data further indicate that the greater the removal of such hydrocarbon-soluble reaction products, assuming two washings to be more effective than a single washing, the greater the effect on the melt index. It is within the scope of the invention to wash as many times as desired, such as one to ten times.

The invention is not to be considered as being limited to the specific embodiments of this disclosure. From it, various modifications will become evident. However, such are considered to be within the scope of the invention.

What is claimed is:

1. A process for copolymerizing ethylene and butene-1 which comprises contacting ethylene containing a minor proportion of butene-1 under polymerization conditions with a catalyst composition consisting essentially of the hydrocarbon-insoluble reaction product separated from the hydrocarbon-soluble reaction product of an admixture formed by contacting a supported chromium oxide catalyst, a portion of said chromium being in the hexavalent state, with an aluminum hydrocarbyl oxide and a hydrocarbylmetal in the presence of a liquid hydrocarbon, said aluminum hydrocarbyl oxide having the formula $R_xAl(OR)_y$ in which R is a hydrocarbyl group containing from 1 to 14 carbon atoms and x and y are whole integers having a sum equal to 3, and said hydrocarbylmetal including compounds of the formula $R_zM$ in which R is a hydrocarbyl group having from 1 to 14 carbon atoms, M is an amphoteric metal selected from aluminum and zinc and z is an integer equal to the valence of M.

2. The process of claim 1 in which said admixture is formed by contacting about one mol of said supported chromium oxide catalyst with said aluminum hydrocarbyl oxide in an amount within the range of about 0.2 mol to about 20 mols and the hydrocarbyl metal is present in an amount of about 0.12 about 1 mol of the alkoxide.

3. The process of claim 1 in which the support of said chromium oxide catalyst is selected from the group consisting of silica, alumina, zirconia and thoria, the chromium content of said catalyst comprising at least about 0.1 weight percent of the total weight of said catalyst.

4. The process of claim 3 in which R is selected from the group consisting of alkyl, aryl, alkaryl, alicyclic and bicyclic hydrocarbons.

5. The process of claim 1 in which said hydrocarbon-insoluble reaction product is separated from said hydrocarbon-soluble reaction product by removing said liquid hydrocarbon from said admixture and said Table I

| Run No. | Catalyst | Wash | Productivity, lb/lb | Melt Index, dg/min. (a) | | Density (g/cc. (b) |
|---|---|---|---|---|---|---|
| | | | | Regular | High Load | |
| 1 | Unwashed | — | 2415 | 0.072 | 17.8 | 0.955 |
| 2 | Washed Twice | n-Hexane | 2250 | 0.626 | 84.7 | 0.959 |
| 3 | Washed Once | n-Hexane | 3110 | 0.242 | 47.0 | 0.958 |
| 4 | Washed Once | n-Pentane | 3410 | 0.280 | 54.0 | 0.957 |

(a) ASTM D 1238-62T; Condition E for melt index, and Condition F for high load melt index
(b) ASTM D 1505-63T These data indicate the operability of the process of this invention. These data also indicate that removal of hydrocarboninsoluble reaction product is washed with a second hydrocarbon liquid.

6. The process of claim 4 in which said chromium oxide catalyst is contacted with diisobutylaluminum isobutoxide and triisobutylaluminum in n-hexane and said n-hexane is separated from the hydrocarbon-insoluble reaction product.

7. The process of claim 6 in which said insoluble reaction product after said separation from said n-hexane is washed with n-hexane.

8. The process of claim 1 in which said hydrocarbylmetal is present in said admixture in an amount within the range of from about 0.1 to about 1 mol per mol of said aluminum hydrocarbyl oxide.

9. The process of claim 1 in which said hydrocarbylmetal is selected from the group consisting of triethylaluminum, triisobutylaluminum and diisopropylzinc.

* * * * *